(12) United States Patent
Meijer (10) Patent No.: US 12,018,340 B2
(45) Date of Patent: Jun. 25, 2024

(54) DIRECT SMELTING PROCESS WITH FULL COMBUSTION

(71) Applicant: TATA STEEL NEDERLAND TECHNOLOGY B.V., Velsen-Noord (NL)

(72) Inventor: Hendrikus Koenraad Albertus Meijer, Bergen (NL)

(73) Assignee: TATA STEEL NEDERLAND TECHNOLOGY B.V., Velsen-Noord (NL)

( * ) Notice: Subject to any disclaimer, the term of this patent is extended or adjusted under 35 U.S.C. 154(b) by 881 days.

(21) Appl. No.: 17/042,673

(22) PCT Filed: Mar. 29, 2019

(86) PCT No.: PCT/EP2019/058002
§ 371 (c)(1),
(2) Date: Sep. 28, 2020

(87) PCT Pub. No.: WO2019/185865
PCT Pub. Date: Oct. 3, 2019

(65) Prior Publication Data
US 2021/0123111 A1    Apr. 29, 2021

(30) Foreign Application Priority Data
Mar. 30, 2018   (EP) .................................... 18165334

(51) Int. Cl.
*C21B 13/00* (2006.01)
*C21B 13/10* (2006.01)
(Continued)

(52) U.S. Cl.
CPC .......... *C21B 13/0026* (2013.01); *C21B 13/10* (2013.01); *F23L 9/04* (2013.01)

(58) Field of Classification Search
None
See application file for complete search history.

(56) References Cited

U.S. PATENT DOCUMENTS

2014/0318320 A1* 10/2014 Dry .......................... C22B 5/12
266/44

FOREIGN PATENT DOCUMENTS

FR            1314346 A      1/1963
JP      2001271107 A     10/2001
(Continued)

OTHER PUBLICATIONS

International Search Report and Written Opinion dated May 17, 2019 for PCT/EP2019/058002 to Tata Steel Nederland Technology B.V. filed Mar. 29, 2019.
(Continued)

*Primary Examiner* — Anthony M Liang
(74) *Attorney, Agent, or Firm* — Vorys, Sater, Seymour and Pease LLP (57) ABSTRACT

Smelting metalliferous feed material process forming molten metal in smelting apparatus including smelt cyclone above and communicating with smelting vessel to contain molten metal and slag bath, including: partially reducing and melting feed material in smelt cyclone, allowing the molten partially reduced feed material flow downwardly into vessel, supplying oxygen-containing gas and carbonaceous material to vessel, smelting molten partially reduced feed material in molten metal and slag bath in vessel forming molten metal discharged from vessel and reaction products projected upwardly from molten bath, at least partially combusting combustible materials in reaction products in vessel space above molten bath, supplying oxygen-containing gas to smelt cyclone. Further combusting reaction products in smelt cyclone, discharging from smelt cyclone offgas including reaction products, supplying oxygen-containing
(Continued)

gas into offgas duct upstream high temperature section combusting remaining offgas combustible materials while sufficiently hot for safe ignition and avoiding downstream burner-managed incineration.

18 Claims, 2 Drawing Sheets

(51) Int. Cl.
  *F23L 9/04* (2006.01)
  *F27B 1/24* (2006.01)
  *F27D 17/00* (2006.01)

(56) References Cited

FOREIGN PATENT DOCUMENTS

| WO | 0022176 A1 | 4/2000 |
|---|---|---|
| WO | 2013082658 A1 | 6/2013 |
| WO | 2015089563 A1 | 6/2015 |

OTHER PUBLICATIONS

Abdul Quader M., Ahmed Shamsuddin, Dawal S.Z., Nukman Y., Renewable and Sustainable Energy Reviews, "Present needs, recent progress and future trends of energy-efficient Ultra-Low Carbon Dioxide (CO2)Steelmaking (ULCOS) program", Elseviers Science, New York, NY., US, https://dx.doi.org/10.1016/j.rser.2015.10.101, vol. 55, pp. 537-549, XP029365879, Mar. 2016.

Jan Van Der Stel, Zeilstra Christiaan, Teerhuis Cornelis, Ouwehand Maarten, Koen Meijer, "Update to the Developments of Hisarna an ULCOS alternative ironmaking process", Dec. 1, 2013, XP055499098.

Office Action dated Oct. 28, 2022 for CN2019800223930.8 to Tata Steel Nederland Technology B.V., 13 pages.

* cited by examiner

DIRECT SMELTING PROCESS WITH FULL COMBUSTION

CROSS-REFERENCE TO RELATED APPLICATIONS

This is a § 371 National Stage Application of International Application No. PCT/EP2019/058002 filed on Mar. 29, 2019, claiming the priority of European Patent Application No. 18165334.6 filed on Mar. 30, 2018.

TECHNICAL FIELD

The present invention relates to a process and an apparatus for smelting a metalliferous material.

In particular, although by no means exclusively, the present invention relates to a smelting process and apparatus for smelting an iron-containing material, such as an iron ore, and producing iron.

BACKGROUND

A known process for smelting a metalliferous material is referred to hereinafter as the "HIsarna" process.

The term "smelting" is herein understood to mean thermal processing wherein chemical reactions that reduce metal oxides take place to produce molten metal.

The HIsarna process is associated particularly with producing molten iron from iron ore or another iron-containing material.

The process is carried out in a smelting apparatus that includes (a) a smelting vessel that includes solids injection lances and oxygen-containing gas injection lances and is adapted to contain a bath of molten metal and slag and (b) a smelt cyclone for pre-treating a metalliferous feed material that defines a cyclone chamber and includes tuyeres for injecting solid feed materials and oxygen-containing gas into the cyclone chamber and is positioned above and communicates directly with the smelting vessel. The HIsarna process and apparatus are described in International application PCT/AU99/00884 (WO 00/022176) in the name of the applicant.

The term "smelt cyclone" is understood herein to mean a vessel that typically defines a vertical cylindrical chamber and includes tuyeres for injecting solid feed materials and oxygen-containing gas into the chamber and is constructed so that feed materials supplied to the chamber move in a path around a vertical central axis of the chamber and can withstand high operating temperatures sufficient to at least partially melt metalliferous feed materials.

The smelting vessel includes refractory-lined sections in a lower hearth and water cooled panels in a side wall and a roof of the vessel, and water is circulated continuously through the panels in a continuous circuit.

The smelting vessel also includes a forehearth connected to the smelting chamber via a forehearth connection that allows continuous metal product outflow from the vessel. A forehearth operates as a molten metal-filled siphon seal, naturally "spilling" excess molten metal from the smelting vessel as it is produced. This allows the molten metal level in the smelting chamber of the smelting vessel to be known and controlled to within a small tolerance—this is essential for plant safety.

In one form of the HIsarna process, carbonaceous feed material (typically coal) and optionally flux (typically calcined limestone) are injected into a molten bath in the smelting vessel. The carbonaceous material is provided as a source of a reductant and a source of energy. Metalliferous feed material, such as iron ore, optionally blended with flux, is injected into and heated and partially melted and partially reduced in the smelt cyclone. This molten, partly reduced metalliferous material flows downwardly from the smelt cyclone into the molten bath in the smelting vessel and is smelted to molten metal in the bath.

Hot reaction gases (typically CO, $CO_2$, $H_2$, and $H_2O$) produced in the molten bath are partially combusted by oxygen-containing gas (typically technical-grade oxygen) in an upper part of the smelting vessel. Heat generated by the post-combustion is transferred to molten droplets in the upper section that fall back into the molten bath to maintain the temperature of the bath.

The hot, partially-combusted reaction gases flow upwardly from the smelting vessel and enter the bottom of the smelt cyclone. Oxygen-containing gas (typically technical-grade oxygen) is injected into the smelt cyclone via tuyeres that are arranged in such a way as to generate a cyclonic swirl pattern in a horizontal plane, i.e. about a vertical central axis of the chamber of the smelt cyclone. This injection of oxygen-containing gas leads to further combustion of smelting vessel gases, resulting in very hot (cyclonic) flames. Finely divided incoming metalliferous feed material is injected pneumatically into these flames via tuyeres in the smelt cyclone, resulting in rapid heating and partial melting accompanied by partial reduction (roughly 10-20% reduction). The reduction is due to both thermal decomposition of hematite and the reducing action of $CO/H_2$ in the reaction gases from the smelting vessel. The hot, partially melted metalliferous feed material is thrown outwards onto the walls of the smelt cyclone by cyclonic swirl action and, as described above, flows downwardly into the smelting vessel below for smelting in that vessel.

Process gas, which is typically referred to as "offgas", resulting from the further post-combustion of reaction gases in the smelt cyclone is taken away from an upper region of the smelt cyclone through an off-gas duct.

The net effect of the above-described form of the HIsarna process is a two-step countercurrent process. Metalliferous feed material is heated and partially reduced by outgoing reaction gases from the smelting vessel (with oxygen-containing gas addition) and flows downwardly into the smelting vessel and is smelted to molten iron in the smelting vessel. In a general sense, this close-coupled countercurrent arrangement increases productivity and energy efficiency relative to (i) a single-step bath smelting process or (ii) one in which metalliferous ore iron ore is externally preheated and/or mildly pre-reduced.

The hot (typically 1200-1800° C. when processing iron-containing metalliferous feed material) offgas leaving the smelt cyclone normally contains residual amounts $CO/H_2$ plus process dust. This dust typically comprises iron ore (as the majority constituent) together with smaller amounts of coal (char) dust and slag.

The applicant has considered a number of options for processing the offgas leaving the smelt cyclone.

In one option considered by the applicant, hot cyclone offgas passes through a connecting duct (termed a "hood") to an afterburning chamber, i.e. a form of an incinerator. The hood is typically of steel membrane-wall construction with a cooling medium (water or steam) inside the wall tubes. Gas from the smelt cyclone is cooled (to some degree) in this hood, depending on geometry/plant size and gas/dust rates.

The hood typically comprises a vertical upflow section followed by a top bend, then vertical downflow section. The key process function of the vertical upflow section is to cool the offgas such that molten materials are substantially solidified. In this manner molten materials are contained on the upflow side of the hood (upstream of the top bend). Wall accretions that accumulate in the upflow section periodically spall and fall back (typically on a time-scale of 1-3 hours), thus maintaining a type of pseudo-equilibrium.

The hood section on the downstream side of the top bend still experiences accretion build-up, but the nature of the accretions is significantly different in the sense that massive, dense accretions from solidifying molten materials are largely absent. With slower accretion build-up and generally weaker/less dense accretions it is possible to operate the downflow side of the hood over extended periods. Normally, gas leaving the top of the hood and passing into the afterburning chamber will be in the temperature range 600-1200° C.

Cyclone offgas is generally too lean to burn if it were first to be cooled and cleaned—the proportion of $CO+H_2$ will typically be less than 20% (gas volume basis) and, as a fuel gas, it would require large amounts of support fuel to sustain a combustion flame. This is generally considered unattractive for cost reasons. To avoid this it is necessary to fully burn residual $CO/H_2$ in the offgas whilst it is still sufficiently hot (600-1200° C.).

Hot offgas combustion in the incinerator involves direct injection of an oxygen-containing gas (typically air or technical-grade oxygen) to fully combust residual combustible materials. This combustion step will typically be conducted in such a way that a required minimum percentage of oxygen is present in the final flue gas (e.g. 1-3% oxygen by volume). This final combustion step will generally have the effect of raising the temperature of the combusted gas relative to that of offgas leaving the connecting duct. Heat will subsequently be recovered from the hot flue gas in a downstream (steam-raising) boiler arrangement.

Another option considered by the applicant is a method for conducting this afterburning step in a safe manner, particularly having regard to start-up conditions when high loads of unburned char can be present and coal dust explosions are possible. This typically involves using an independent gas burner system to maintain a combustion-zone temperature (in the afterburning chamber) at a minimum of about 700° C.

Another option considered by the applicant is a variation on the above-described process that involves operation with a shortened hood upflow section in conjunction with annular injection of cold gas representing about 50-150% of the main (hot) process gas flow. This gas is typically injected at or near the bottom of the vertical upflow section of the hood to form a layer of cold gas adjacent to the walls, thereby minimising wall accretion formation. Injected cold gas may be recycled process gas, air or some other suitable gas.

The above description is not to be taken as an admission of the common general knowledge in Australia or elsewhere.

SUMMARY OF THE DISCLOSURE

The present invention is based on the realisation that cooling CO-containing smelt cyclone offgas produced in the HIsarna process as it passes through an off-gas hood on its way to a temperature-controlled incineration chamber is unnecessary and even, at times, counterproductive. More particularly, the present invention is based on a realisation that by adding essentially all the required oxygen for final combustion in the upper reaches of a cyclone (or any position between a cyclone outlet and an inlet region of a main upflow section of the hood, combustion can occur whilst the gas is still hot (from the cyclone) and ignition is inherently guaranteed (e.g. by hot, glowing char embers in the gas). The applicant has realised that one advantage of this arrangement is that a downstream incineration chamber and associated burner system are not required, thereby simplifying the process and making it easier and safer to operate the HIsarna process.

According to the present invention there is provided a process for smelting a metalliferous feed material, such as an iron-containing feed material, to form a molten metal in a smelting apparatus, with the apparatus including (i) a smelting vessel that is adapted to contain a bath of molten metal and slag and (ii) a smelt cyclone that is positioned above and communicates with the smelting vessel, and (iii) an offgas duct for transferring process gas from the smelt cyclone away from the smelt cyclone and with the process including the steps of:

(i) partially reducing and melting a metalliferous feed material in the smelt cyclone and allowing the molten partially reduced metalliferous feed material to flow downwardly into the vessel, (ii) supplying an oxygen-containing gas and a carbonaceous material to the vessel and smelting molten partially reduced metalliferous feed material in a bath of molten metal and slag in the vessel and forming molten metal that ultimately is discharged from the vessel and reaction products (including solids and gases) that are projected upwardly from the molten bath, (iii) at least partially combusting combustible materials in the reaction products in a space in the vessel that is above the molten bath, (iv) supplying oxygen-containing gas to the smelt cyclone and further combusting combustible materials in the reaction products in the smelt cyclone, (v) discharging an offgas from the smelt cyclone into the offgas duct, the offgas including the reaction products, and (vi) supplying oxygen-containing gas into the offgas duct in an upstream (in the direction of movement of the offgas through the duct) high temperature section of the offgas duct so that there is combustion of the remaining combustible materials in the offgas while the offgas is hot.

The process may include operating the process so that the total heat loss to all water-cooled or other cooling elements for the smelting vessel and the smelt cyclone, is in a range of 1-3 GJ per tonne of metal product produced in the process.

Step (iii) may include combusting combustible materials in the reaction products in the space in the vessel that is above the molten bath to a post-combustion degree of at least 30%, typically at least 40%, typically less than 60%, and typically in a range of 30-60%.

In the context of the invention, the post-combustion degree is calculated as $PC=100\times(CO_2+H_2O)/(CO+CO_2+H_2+H_2O)$ molar basis.

Step (vi) may include supplying oxygen-containing gas into the high temperature section of the offgas duct and combusting the remaining combustible materials in the offgas in a downstream section of the offgas duct (in the direction of movement of the offgas through the duct) so that there is combustion of the combustible materials in the offgas while the offgas is at least 1500° C., typically at least 1600° C., and more typically at least 1700° C. when the metalliferous feed material is an iron-containing feed material.

Step (vi) may include supplying oxygen-containing gas into an inlet section of the offgas duct that extends upwardly, typically vertically, from a roof of the smelt cyclone. The inlet section forms part of the high temperature section of the offgas duct. The inlet section may be a vertical extension of the smelt cyclone. The amount of oxygen may be calculated such that a final downstream flue gas from the offgas duct contains 0.5-8% (by volume), typically 3-7%, free oxygen when final combustion, including combustion of substantially all the char in the offgas, is complete.

In a situation in which the offgas duct includes an inlet section extending from the smelt cyclone, a hood with (a) an upflow section, (b) a bend, and (c) a downflow section, step (vi) may include supplying oxygen-containing gas into the inlet section and a cold recycle gas at the bottom of the upflow section. The term "cold recycle gas" is understood herein to mean off gas that has been processed as described above and cooled to an ambient temperature. It may also comprise gas that has been taken from the flue stream after the boiler, de-dusted in a baghouse and compressed for recycling—in this case recycle gas temperature will typically be in the range 200-400° C. The volume rate of the cold recycle gas may be 50-150% of that of the offgas flow in the offgas duct. The amount of oxygen injected into the inlet section may be calculated such that a final downstream flue gas from the offgas duct contains 0.5-9% (volume), typically 3-8%, free oxygen when final combustion, including combustion of substantially all the char, is complete.

In a situation in which the offgas duct includes the inlet section extending from the smelt cyclone, a hood with (a) an upflow section, (b) a bend, and (c) a downflow section, step (vi) may include supplying oxygen-containing gas into the inlet section and cold air at the bottom of the upflow section. The volume rate of the cold air may be 50-150% of that of the offgas flow in the duct. The total amount of oxygen injected into the inlet section and the amount of oxygen in the cold air may be calculated such that a final downstream flue gas from the offgas hood contains 0.5-16% (volume), typically 3-15%, free oxygen when final combustion, including combustion of substantially all the char, is complete.

The process may include forming frozen slag layers on internal surfaces of the high temperature section of the offgas duct via continuous heat extraction using water-cooled or steam-cooled or other suitable elements in side-walls of the section.

The process may include forming frozen slag layers on internal surfaces of the smelt cyclone via continuous heat extraction using water-cooled or steam-cooled or other suitable elements in side-walls of the smelt cyclone.

The process may include forming frozen slag layers on internal surfaces of the smelting vessel via continuous heat extraction using water-cooled or steam-cooled or other suitable elements in side-walls of the smelting vessel (excluding a refractory-lined hearth of the smelting vessel).

One embodiment of the invention includes (a) a process gas with a post-combustion degree in a range 30-60% and entrained solids leaving the smelting vessel and passing into the smelt cyclone, (b) oxygen-containing gas being added to the smelt cyclone to further combust the process gas and combustible solids, with the process gas leaving the smelt cyclone as an offgas, (c) sufficient total oxygen-containing gas being added to the offgas in a high temperature section of the offgas duct typically before the vertical upflow section of the offgas hood, for complete combustion of combustible materials in the offgas and maintenance of a final offgas oxygen concentration in the range 0.5-8%, and (d) total heat loss to all water-cooled or other cooling elements for the smelter apparatus and the smelt cyclone being in a range 1-3 GJ per tonne of metal product.

Another embodiment of the invention includes (a) a process gas having a post-combustion degree in a range 30-60% and entrained solids leaving the smelting vessel and passing into the smelt cyclone, (b) oxygen-containing gas being added to the smelt cyclone to further combust the process gas and combustible solids, with the process gas leaving the smelt cyclone as an offgas in the offgas duct, (c) a cold recycle gas being added to the offgas duct, typically at or near the bottom of the vertical upflow section of the hood, in an amount corresponding to 50-150% (by volume at normal conditions, 0° C. and 1 atmosphere absolute) of the hot offgas flow at that point, (d) sufficient total oxygen-containing gas being added in the high temperature section of the offgas duct, typically before (or near the bottom of) the vertical upflow section of the offgas hood, for complete combustion of combustible materials in the offgas and maintenance of a final offgas oxygen concentration in a range 0.5-9%, and (e) total heat loss to all water-cooled or other cooling elements for the smelter and the smelt cyclone being in a range 1-3 GJ per tonne of metal product.

Another, although not the only other, embodiment of the invention includes (a) a process gas having a post-combustion degree in a range 30-60% and entrained solids leaving the smelting vessel and passing into the smelt cyclone, (b) oxygen-containing gas being added to the smelt cyclone to further combust the process gas and combustible solids, with the process gas leaving the smelt cyclone as an offgas in the offgas duct (c) cold air being added to the offgas duct, typically at or near the bottom of the vertical upflow section of the hood in an amount corresponding to 50-150% (by volume at normal conditions, 0° C. and 1 atmosphere absolute) of the main hot process gas flow at that point (d) sufficient total oxygen-containing gas being added in the high temperature section of the offgas duct, typically before (or near the bottom of) the main vertical upflow section of the offgas hood, (including the cold air) for complete combustion of combustible materials in the offgas and maintenance of a final flue gas oxygen concentration in a range 0.5-16%, and (e) total heat loss to all water-cooled or other cooling elements for the smelter and the smelt cyclone being in a range 1-3 GJ per tonne of metal product.

The metalliferous feed material may be any suitable material. By way of example, the metalliferous feed material may be an iron-containing feed material. The invention is not confined to iron-containing materials.

According to the present invention there is provided a process for smelting a metalliferous feed material, such as an iron-containing feed material, to form a molten metal in a smelting apparatus, with the apparatus including (i) a smelting vessel that is adapted to contain a bath of molten metal and slag and (ii) a smelt cyclone that is positioned above and communicates with the smelting vessel, and (iii) an offgas duct for transferring process gas from the smelt cyclone away from the smelt cyclone and with the process including the steps of:

(i) partially reducing and melting a metalliferous feed material in the smelt cyclone and allowing the molten partially reduced metalliferous feed material to flow downwardly into the vessel, (ii) supplying an oxygen-containing gas and a carbonaceous material to the vessel and smelting molten partially reduced metalliferous feed material in a bath of molten metal and slag in the vessel and forming molten metal that ultimately is discharged from the vessel and reaction products (including solids and gases) that are projected upwardly from the molten bath, (iii) at least partially combusting combustible materials in the reaction products in a space in the vessel that is above the molten bath, (iv) supplying oxygen-containing gas to the smelt cyclone and further combusting combustible materials in the reaction products in the smelt cyclone, (v) discharging an offgas from the smelt cyclone into the offgas duct, the offgas including the reaction products, and (vi) operating the process so that there is combustion of the remaining combustible materials in the offgas in the offgas duct while the offgas is hot and the total heat loss to all water-cooled or other cooling elements for the smelting vessel and the smelt cyclone is in a range of 1-3 GJ per tonne of metal product produced in the process.

The present invention also provides an apparatus for smelting a metalliferous feed material to form a molten metal including (i) a smelting vessel that is adapted to contain a bath of molten metal and slag and (ii) a smelt cyclone that is positioned above and communicates with the smelting vessel, (iii) an offgas duct for transferring offgas from the smelt cyclone away from the smelt cyclone, and (iv) a means for supplying oxygen-containing gas into the offgas duct in an upstream high temperature section of the offgas duct (in the direction of movement of the offgas through the duct) so that there is combustion of combustible materials in the offgas while the offgas is hot.

The offgas duct may include an inlet section that extends upwardly, typically vertically, from a roof of the smelt cyclone.

The inlet section may be a vertical extension of the smelt cyclone.

The offgas duct may include a hood with (a) an upflow section, (b) a bend, and (c) a downflow section.

The offgas duct may include a kinked section to prevent hood accretions from falling directly into the smelt cyclone and the smelting vessel.

The offgas duct may include water-cooled or other suitable cooled sections in the upstream high temperature section of the offgas duct.

The above-described apparatus of the invention does not require an incinerator or suitable device to fully combust combustible materials in the offgas. Complete combustion is achieved in the offgas duct.

BRIEF DESCRIPTION OF THE DRAWINGS

The present invention is described further by way of example with reference to the accompanying drawings, of which.

DESCRIPTION OF EMBODIMENTS

One embodiment of the HIsarna process and apparatus in accordance with the invention is described with reference to FIG. 1.

Figure 1:
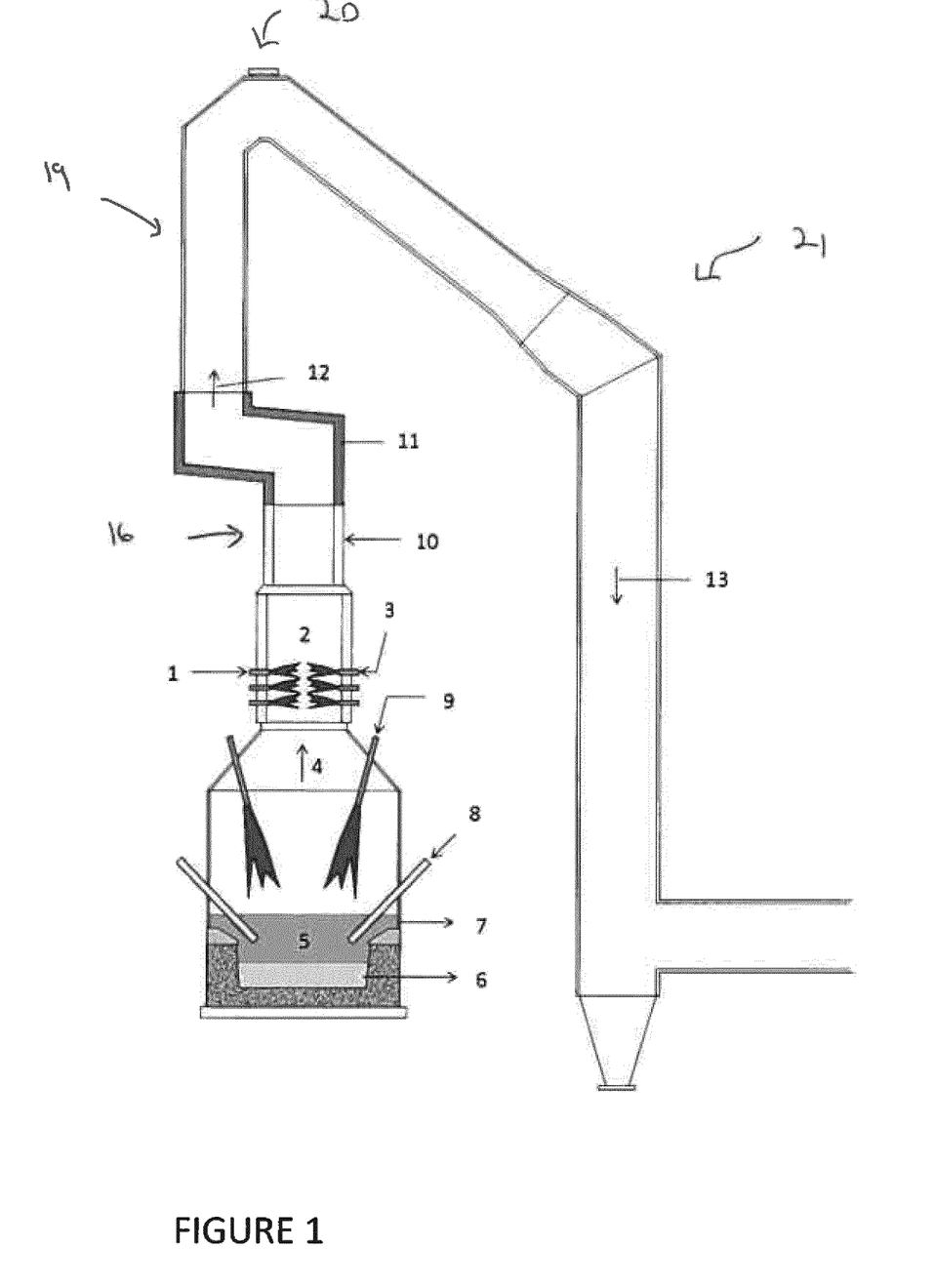
FIG. 1 is a schematic diagram which illustrates one embodiment of an HIsarna smelting apparatus in accordance with the present invention.

The process and the apparatus shown in FIG. 1 are based on a smelt cyclone (2) and a molten bath-based smelting vessel (5) located directly beneath the smelt cyclone (2), with direct communication between the chambers of the smelt cyclone 2 and the smelting vessel (5).

The HIsarna process is a two-step counter-current process. Metalliferous feed material, such as dried iron ore fines, is heated and partially reduced in the smelt cyclone (2) by outgoing reaction gases from the smelting vessel (4) and flows downwardly into the smelting vessel (5) and is smelted to molten iron. Molten iron (6) is discharged from smelting vessel (5) via a forehearth. Molten slag (7) produced in the process is discharged from smelting vessel (5) via a slag tap hole. Offgas is discharged upwardly from the smelt cyclone (2) via an offgas duct. The offgas is processed as required.

In accordance with the invention, combustible materials in the offgas that are discharged from the smelt cyclone (2) are combusted in the offgas duct while the offgas is hot, typically at least 1700° C. when the metalliferous feed material is an iron-containing feed material.

With further reference to FIG. 1, dried iron ore fines (1) are injected into smelt cyclone (2) where the ore is at least partially reduced and melted. Heat for this melting/reduction step is generated by burning injected oxygen (3) with hot smelting vessel offgas (4) from the smelting vessel (5). The resulting partly molten ore runs downwards into smelting vessel (5), where it is smelted to produce molten metal (6) and slag (7). Coal (8) is injected into the bath via water-cooled lances. Oxygen (9) is injected into an upper region of the smelting vessel (5), where bath-derived gas is post-combusted and combustible solids are combusted to generate heat for the bath smelting step. Smelter offgas (4) is the product of this post-combustion/combustion step and the resulting post-combustion degree, calculated as PC=100× $(CO_2+H_2O)/(CO+CO_2+H_2+H_2O)$ molar basis is in a range 30-60% (depending on coal type). With higher volatile coals (e.g. 35% volatiles) PC will be in the lower end of this range and with low volatile coals (e.g. 10% volatiles) it will be closer to the upper end. This smelter offgas (4) may carry significant amounts of coal char with it, again depending on coal type.

The oxygen (3) that is injected into smelt cyclone (2) combusts a portion of the remaining combustible materials in the smelter offgas (4). Typically, the offgas that flows upwardly from the smelt cyclone (2) into the offgas duct above the smelt cyclone (2) has a post-combustion degree of 85-90% (by volume) and may contain combustible solids.

The offgas duct includes an inlet section (16) that extends upwardly (in this embodiment vertically upwardly) from the smelt cyclone (2), a kinked section (11), and a hood. The inlet section (16) and the kinked section (11) form a high temperature section of the offgas duct. The hood includes an upflow leg (19), a bend (20), and a downflow leg (21).

Figure 2:
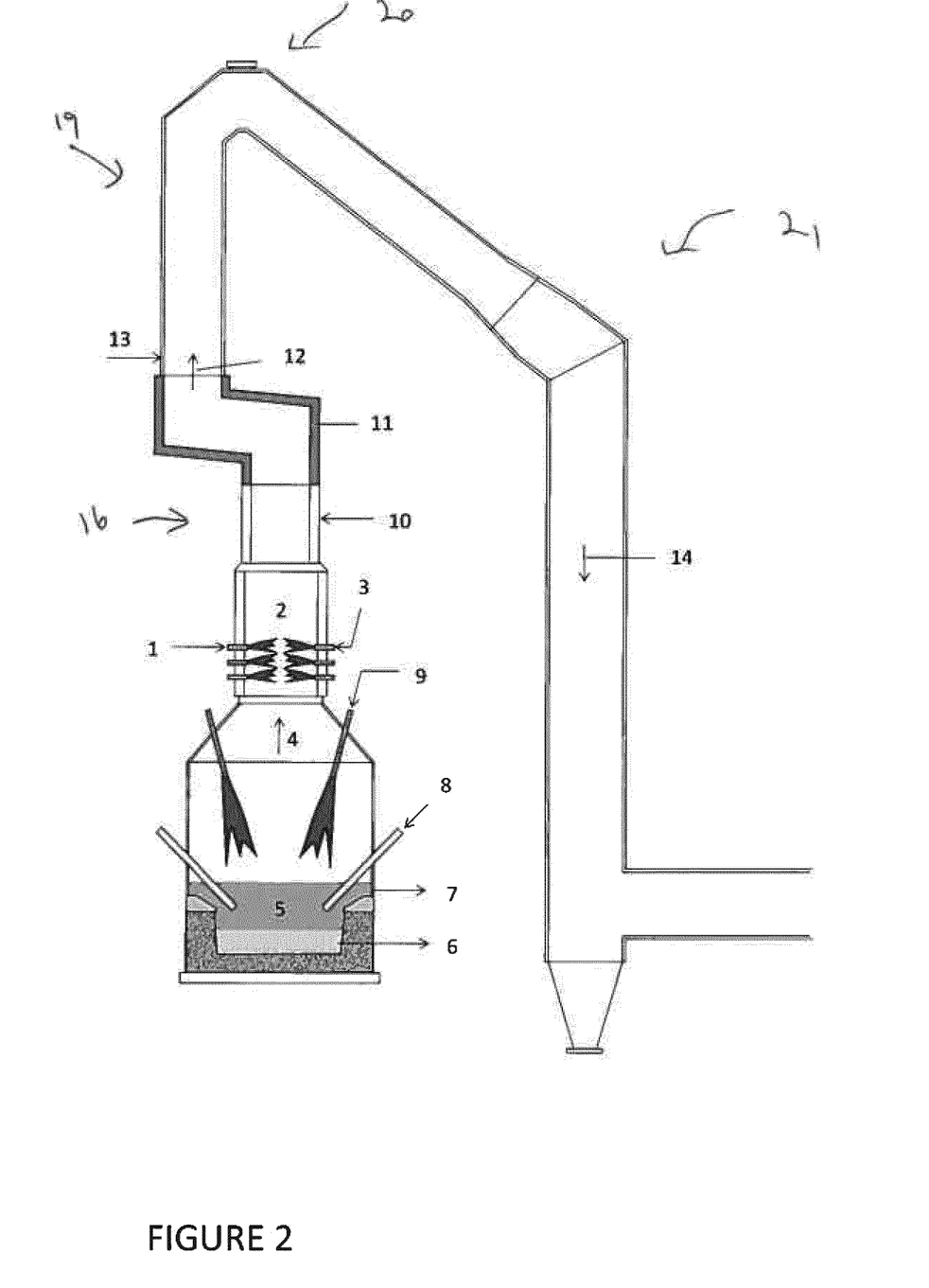
FIG. 2 is a schematic diagram which illustrates another, although not the only other, embodiment of an HIsarna smelting apparatus in accordance with the present invention.

As viewed in FIG. 2, the inlet section (16) is very much a vertical extension of the cylindrical smelt cyclone (2) with a diameter that is only slightly less than that of the smelt cyclone (2). In some respects, the inlet section (16) may be described as a transition between (a) the functional section of the smelt cyclone (2) in which there is injection of metalliferous material and oxygen into the cyclone and (b) the offgas duct.

Oxygen-containing gas (10), typically technical-grade oxygen, is injected into the inlet section (16) of the offgas duct. It can readily be appreciated that in this location the offgas will be hot and combustion of combustible materials (solids and gas) in the offgas will occur without the need for any external ignition sources. The amount of oxygen in (10) is calculated such that the final downstream flue gas from the process, for example at the location identified by the arrow 14 in the downflow leg 21 of the hood, will contain 0.5-8% (by volume) free oxygen when final combustion, including combustion of substantially all the char in the offgas, is complete.

Hot cyclone offgas with oxygen-containing gas passes from the inlet section (16) into the kinked section (11). The purpose of the kinked section (11) is to prevent accretions that inevitably form in downstream sections of the offgas duct, such as the upflow leg (19) from falling directly into the smelt cyclone (2) and the smelting vessel (5) and causing damage. The kinked section (11) is disclosed by the applicant in Australian provisional application 2013904992 lodged on 20 Dec. 2013. The disclosure in the provisional specification is incorporated herein by cross-reference. More particularly, the kinked section (11) is formed to cause off-gas to undergo a substantial change of direction as it flows through the inlet section (16). The substantial change in direction in the inlet section (16) moves off-gas quickly away from the upward (in these embodiments vertical) extension of the smelting vessel (5) and the smelt cyclone (2) so that any accretions that form in the offgas duct (which are more likely to form downstream of the inlet section (16) in the direction of movement of off-gas) and therefore cannot fall directly into the molten bath in smelting vessel (5).

Hot cyclone offgas with oxygen-containing gas passes from the kinked section (11) into the vertical upflow section (19) of the offgas hood. At this point final combustion may not yet be complete, and burning of combustible materials may continue for a significant way up towards the top of the hood.

By the time the offgas (by this stage properly described as a flue gas) passes downwards on the outlet side, i.e. in the downflow section (21), of the offgas hood combustion is essentially complete and the gas is progressively cooled such that no (bulk) molten materials are present (typically below about 1100-1200° C.). Whilst not shown in FIG. 1, the flue gas is transferred from the downflow section (21) for further processing as required.

The internal surfaces of the side-walls of the smelting vessel (5) above the refractory-lined hearth of the vessel, the walls of the smelt cyclone (2), the walls of the high temperature sections of the offgas duct, namely the inlet section (16), and the walls of the kinked section (11), are all water-cooled or steam-cooled or otherwise cooled and have protective, self-healing frozen slag layers that form via contact and then "freezing" of hot solids and molten material entrained in the offgas. Continuous heat extraction is needed to maintain these freeze-layers. The quantity of heat removed (per tonne of metal produced in normal operation) via the smelting vessel (5) and the smelt cyclone (2) is generally in a range 1-3 GJ/t when the process is running normally. With low production rates (e.g. during start-up) heat extraction can easily exceed 3 GJ/t, but as production climbs into the normal range it stabilises in the range indicated. It is noted that appropriate cooling and formation and maintenance of "freeze" layers on the internal surfaces of the high temperature sections of the offgas duct is important in order to maintain the structural integrity of this section of the offgas duct.

One advantage of embodiment shown in FIG. 1 is that a downstream incineration chamber and associated burner system are not required, thereby simplifying the process and making it easier and safer to operate the HIsarna process.

Another advantage of the FIG. 1 embodiment is that cooling and then re-heating offgas to combust combustible materials in offgas is not required.

In summary, the embodiment shown in FIG. 1 includes (a) a process gas with a post-combustion degree in a range 30-60% and entrained solids leaving the smelting vessel and passing into the smelt cyclone, (b) adding oxygen-containing gas to further post-combust the process gas and combustible solids in the smelt cyclone and (c) sufficient total oxygen-containing gas being added to the offgas in the high temperature inlet section of the offgas duct for complete combustion of combustible materials in the offgas and maintenance of a final offgas oxygen concentration in the range 0.5-8%, and (d) total heat loss to all water-cooled or other cooling elements for the smelting vessel and the smelt cyclone is in a range of 1-3 GJ per tonne of metal product.

Another embodiment of the HIsarna process and apparatus in accordance with the invention is described with reference to FIG. 2. The smelt cyclone, the smelting vessel, and the offgas duct are the same units as in the embodiment shown in FIG. 1 and the same reference numerals are used to describe the same structural features.

Dried iron ore fines (1) are injected into smelt cyclone (2) where the ore is at least partially reduced and melted. Heat for this melting/reduction step is generated by burning injected oxygen (3) with hot smelting vessel offgas (4). The resulting partly molten ore runs downwards into smelting vessel (5), where it is smelted to produce metal (6) and slag (7). Coal (8) is injected into the bath via water-cooled lances. Oxygen (9) is injected into the upper region of the smelting vessel, where bath-derived gas is post-combusted to generate heat for the bath smelting step. Smelter offgas (4) is the product of this post-combustion step and the resulting post-combustion degree is in the range 30-60% (depending on coal type). With higher volatile coals (e.g. 35% volatiles) PC will be in the lower end of this range and with low volatile coals (e.g. 10% volatiles) it will be closer to the upper end. This smelter gas may carry significant amounts of coal char with it, again depending on coal type.

Additional oxygen-containing gas (10), typically technical-grade oxygen, is injected into the inlet section (16) of the offgas duct, before it enters the kinked section (11) of the duct.

In this embodiment, cold recycle gas (13) is added at the bottom of the hood vertical upflow section (19) at a volume rate of 50-150% of that of the main (hot) process gas flow (12). The amount of oxygen (10) is calculated such that the final downstream flue gas from the process (14) will contain 0.5-9% (volume) free oxygen when final combustion, including combustion of substantially all the char, is complete.

By the time the offgas (flue gas) passes downwards on the outlet side of the offgas hood (14) combustion is essentially complete and the gas is progressively cooled such that no (bulk) molten materials are present (typically below about 1100-1200° C.).

The internal surfaces of the side-walls of the smelting vessel (5) above the refractory-lined hearth, the walls of the smelt cyclone (2) and the walls of the kinked section (11) are all water-cooled or steam-cooled or otherwise cooled and have protective, self-healing frozen slag layers. Continuous heat extraction is needed to maintain these freeze-layers and the quantity of heat removed (per tonne of metal produced in normal operation) is generally in a range of 1-3 GJ/t when the process is running normally. With low production rates (e.g. during start up) heat extraction can easily exceed 3

GJ/t, but as production climbs into the normal range it stabilises in the range indicated.

The embodiment shown in FIG. 2 has the same advantages as the FIG. 1 embodiment.

In summary, the embodiment shown in FIG. 2 includes (a) a process gas having a post-combustion degree in a range 30-60% and entrained solids leaving the smelting vessel and passing into the smelt cyclone, (b) oxygen-containing gas being added to the smelt cyclone to further post-combust the process gas and combustible solids, and (c) a cold recycle gas being added to the offgas duct at or near the bottom of the vertical upflow section of the hood in an amount corresponding to 50-150% (by volume at normal conditions, 0° C. and 1 atmosphere absolute) of the hot offgas flow at that point, (c) sufficient total oxygen-containing gas being added in the high temperature inlet section of the offgas duct for complete combustion of combustible materials in the offgas and maintenance of a final offgas oxygen concentration in the range 0.5-9%, and (d) total heat loss to all water-cooled elements for the smelting vessel and the smelt cyclone is in a range of 1-3 GJ per tonne of metal product.

Another, although not the only other, embodiment of the HIsarna process and apparatus in accordance with the invention is the same as that described with reference to FIG. 2, with the exception that the cold recycle gas (13) is replaced with cold air (13) at the bottom of the hood vertical upflow section (19) at a volume rate of 50-150% of that of the main (hot) process gas flow (12). The amount of oxygen (10) and the oxygen in the cold air (13) is calculated such that the final downstream flue gas from the process (14) will contain 0.5-16% (volume) free oxygen when final combustion, including combustion of substantially all the char, is complete.

The embodiment has the same advantages as the FIGS. 1 and 2 embodiments.

In summary, the embodiment includes (a) (a) a process gas having a post-combustion degree in a range 30-60% leaving the smelting vessel and passing into the smelt cyclone, (b) adding oxygen-containing gas into the smelt cyclone to further post-combust the process gas and (c) cold air being added to the offgas duct, at or near the bottom of the vertical upflow section of the hood in an amount corresponding to 50-150% (by volume at normal conditions, 0° C. and 1 atmosphere absolute) of the main hot process gas flow at that point (c) sufficient total oxygen-containing gas being added in the high temperature inlet section of the offgas duct for complete combustion and maintenance of a final flue gas oxygen concentration in the range 0.5-16%, and (d) total heat loss to all water-cooled elements for the smelting vessel and the smelt cyclone is in a range of 1-3 GJ per tonne of metal product.

Many modifications may be made to the embodiments of the process and the apparatus of the present invention described above without departing from the spirit and scope of the invention.

By way of example, whilst the embodiments include particular representations of the shape and size of the smelting vessel (5), the smelt cyclone (2) and the offgas duct, including the associated equipment such as lances, the present invention is not confined to these arrangements and extends to any suitable constructions.

The invention claimed is:

1. A process for smelting a metalliferous feed material to form a molten metal in a smelting apparatus, with the apparatus including a smelting vessel that is adapted to contain a bath of molten metal and slag and a smelt cyclone that is positioned above and communicates with the smelting vessel, and with the process including the steps of:
   (i) partially reducing and melting a metalliferous feed material in the smelt cyclone and allowing the molten partially reduced metalliferous feed material to flow downwardly into the vessel,
   (ii) supplying an oxygen-containing gas and a carbonaceous material to the vessel and smelting molten partially reduced metalliferous feed material in a bath of molten metal and slag in the vessel and forming molten metal that ultimately is discharged from the vessel and reaction products comprising solids and gases, that are projected upwardly from the molten bath,
   (iii) at least partially combusting combustible materials in the reaction products in a space in the vessel that is above the molten bath,
   (iv) supplying oxygen-containing gas to the smelt cyclone and further combusting combustible materials in the reaction products in the smelt cyclone,
   (v) discharging an offgas from the smelt cyclone into an offgas duct, the offgas including the reaction products, and
   (vi) supplying oxygen-containing gas into the offgas duct in an upstream, high temperature section of the offgas duct in the direction of movement of the offgas through the duct, so that there is combustion of the remaining combustible materials in the offgas while the offgas is sufficiently hot to ensure safe ignition and thereby avoid the need for any type of downstream burner-managed incineration device.

2. The process defined in claim 1, includes operating the process so that total heat loss to all water-cooled or other cooling elements for the smelting vessel and the smelt cyclone is in a range of 1-3 GJ per tonne of metal product produced in the process.

3. The process defined in claim 1, wherein step (iii) includes combusting combustible materials in the reaction products in the space in the vessel that is above the molten bath to a post-combustion degree of 30-60%.

4. The process defined in claim 1, wherein step (vi) includes supplying oxygen-containing gas into the high temperature section of the offgas duct and combusting the remaining combustible materials in the offgas in the downstream section of the offgas duct in the direction of movement of the offgas through the duct, so that there is combustion of the combustible materials in the offgas while the offgas is at least 1500° C. when the metalliferous feed material is an iron-containing feed material.

5. The process defined in claim 1, wherein step (vi) includes supplying oxygen-containing gas into an inlet section of the offgas duct that extends vertically, from a roof of the smelt cyclone.

6. The process defined in claim 5, wherein the amount of oxygen is calculated such that a final downstream flue gas from the offgas duct contains 0.5-8% by volume free oxygen when final combustion is complete.

7. The process defined in claim 1, wherein, in a situation in which the offgas duct includes: an inlet section that extends vertically, from a roof of the smelt cyclone, a hood with an upflow section, a bend, and a downflow section; step (vi) includes supplying oxygen-containing gas into the inlet section and a cold recycle gas at the bottom of the upflow section.

8. The process defined in claim 7, wherein the volume rate of the cold recycle gas is 50-150% of that of the offgas flow in the offgas duct.

9. The process defined in claim 7, wherein the amount of oxygen injected into the inlet section is calculated such that a final downstream flue gas from the offgas duct contains 0.5-9% by volume free oxygen when final combustion is complete.

10. The process defined in claim 1, wherein, in a situation in which the offgas duct includes: an inlet section that extends vertically, from a roof of the smelt cyclone, a hood with an upflow section, a bend, and a downflow section; step (vi) includes supplying oxygen-containing gas into the inlet section and cold air at the bottom of the upflow section.

11. The process defined in claim 10, wherein the volume rate of the cold air is 50-150% of that of the offgas flow in the duct.

12. The process defined in claim 10, wherein the amount of oxygen injected into the inlet section and the amount of oxygen in the cold air is calculated such that a final downstream flue gas from the offgas hood contains 0.5-16% volume free oxygen when final combustion is complete.

13. The process defined in claim 1 includes forming frozen slag layers on internal surfaces of the high temperature section of the offgas duct via continuous heat extraction using water-cooled or steam-cooled or other suitable elements in side-walls of the section.

14. The process defined in claim 1 includes forming frozen slag layers on internal surfaces of the smelt cyclone via continuous heat extraction using water-cooled or steam-cooled or other suitable elements in side-walls of the smelt cyclone.

15. The process defined in claim 1 includes forming frozen slag layers on internal surfaces of the smelting vessel via continuous heat extraction using water-cooled or steam-cooled or other suitable elements in side-walls of the smelting vessel wherein the vessel excludes the refractory-lined hearth.

16. The process defined in claim 1, wherein the offgas is at least 1600° C.

17. The process defined in claim 1, wherein the offgas is at least 1700° C.

18. The process defined in claim 1, wherein step (vi) includes supplying oxygen-containing gas into an inlet section of the offgas duct that extends upwardly from a roof of the smelt cyclone.

* * * * *